United States Patent [19]
Capelle et al.

[11] Patent Number: 5,699,663
[45] Date of Patent: Dec. 23, 1997

[54] METHOD OF PREVENTING INSTABILITIES PRODUCED BY COMBUSTION IN A TURBOJET ENGINE

[75] Inventors: Jean-Yves Capelle, Montlhery; Michel André Albert Desaulty, Vert Saint Denis; Eric Charles Louis Le Letty, Le Mee Sur Seine, all of France

[73] Assignee: Societe Nationale d'Etude et de Construction de Moteurs d'Aviation "SNECMA", Paris, France

[21] Appl. No.: 622,279

[22] Filed: Mar. 27, 1996

[30] Foreign Application Priority Data

Mar. 29, 1995 [FR] France ................................. 95 03664

[51] Int. Cl.$^6$ ................................................. B63H 11/00
[52] U.S. Cl. ........................... 60/204; 60/261; 60/39.06
[58] Field of Search ........................... 60/204, 223, 261, 60/264, 39.06, 746, 749

[56] References Cited

U.S. PATENT DOCUMENTS

| | | |
|---|---|---|
| 2,911,788 | 11/1959 | Lewis et al. |
| 2,934,891 | 5/1960 | Brown ................................. 60/261 |
| 3,041,826 | 7/1962 | Coar. |
| 3,128,598 | 4/1964 | Gordon ................................. 60/261 |
| 3,402,556 | 9/1968 | Lavash et al. |
| 4,095,420 | 6/1978 | Abernethy et al. |
| 4,720,971 | 1/1988 | Dubell. |
| 5,320,490 | 6/1994 | Corbin et al. |

FOREIGN PATENT DOCUMENTS

| | | |
|---|---|---|
| 0 005 425 | 11/1979 | European Pat. Off. |
| 2 554 170 | 5/1985 | France. |
| 768969 | 2/1957 | United Kingdom. |
| 1 452 487 | 10/1976 | United Kingdom. |
| 2 275 738 | 9/1994 | United Kingdom. |

*Primary Examiner*—Charles G. Freay
*Attorney, Agent, or Firm*—Oblon, Spivak, McClelland, Maier & Neustadt, P.C.

[57] ABSTRACT

A method of preventing instabilities due to combustion in a multi-flow turbojet engine including an afterburner into which an air-fuel mixture is injected in proportions measured in richness terms, which includes the steps of detecting experimentally, when tuning the turbojet engine, the zones of vibrations due to afterburn as a function of the operating conditions of the engine and as a function of the afterburn operating region, and selecting operating points for regulating the fuel richness of each flow to enable the detected vibration zones to be avoided.

7 Claims, 2 Drawing Sheets

METHOD OF PREVENTING INSTABILITIES PRODUCED BY COMBUSTION IN A TURBOJET ENGINE

BACKGROUND OF THE INVENTION

1. Field of the Invention

The invention relates to a method of preventing instabilities brought about by combustion in a turbojet engine, and is particularly applicable to multiflow aircraft engines fitted with an afterburner.

The combustion and afterburn chambers of aircraft engines, exhibit, under certain operating conditions, instabilities caused by a coupling of unstable oscillations resulting from the release of heat and fluctuations in acoustic pressure. Two types of instabilities are particularly critical for the mechanical and thermal performance of the afterburner chambers. The first type of instability is characterized by a frequency f1 of the order of a few hundred Hertz corresponding to a vibration mode of longitudinal type. The second type of instability is characterized by a frequency f2 of the order of a few thousand Hertz corresponding to a vibration mode of radial longitudinal type usually termed "screech".

2. Description of the Prior Art

To prevent these phenomena appearing, the combustion and/or afterburner chambers are often equipped with passive damping devices formed, for example, by an assembly of openings acting as Helmholtz resonators. However, these devices do not generally make it possible to prevent vibrations at all frequencies, and their effectiveness is limited.

SUMMARY OF THE INVENTION

The object of the present invention is to provide a method by which combustion instabilities corresponding to the different modes of vibration can be avoided, so that operation of existing passive damping systems can be completed.

For this purpose, the method proposes identifying experimentally in an engine tuning phase the zones in which the vibration frequencies develop, and then to select operating points for regulating the fuel which enable the vibration zones to be avoided.

More particularly, according to the invention, there is provided a method of preventing instabilities due to combustion in a turbojet engine comprising at least two flows termed primary flow and secondary flow, and an afterburner into which an air-fuel mixture is injected in proportions measured in terms of primary richness and secondary richness from each of said flows and of overall richness, said method comprising the steps of: detecting experimentally, when tuning said turbojet engine, vibration zones due to afterburn as a function of the operating conditions of said engine and as a function of the afterburn operating region; and, selecting operating points for regulating the fuel richness from each flow to enable the detected vibration zones to be avoided.

Preferred features and advantages of the invention will become apparent from the following description of embodiments of the invention, given by way of non-limitative example, and described with reference to the attached drawings.

DESCRIPTION OF THE PREFERRED EMBODIMENTS

Throughout the following description and claims, the richness of the fuel is defined by the ratio of fuel flow to the associated air flow, and the overall richness is defined by the ratio of the total flow of fuel to the total flow of air.

Figure 3:
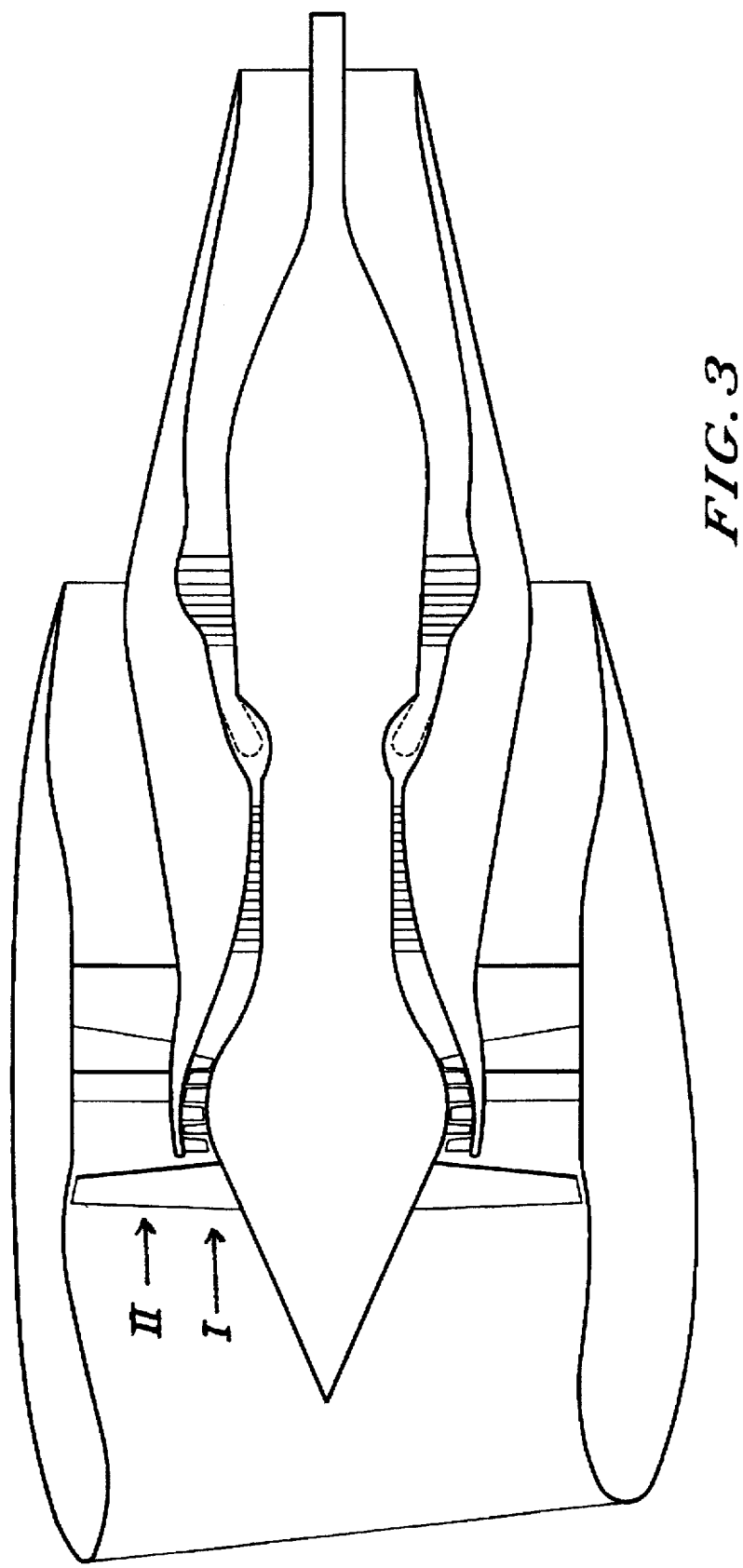
FIG. 3 shows a turbojet engine with a primary flow and secondary flow.

The zones in which vibrations develop due to afterburn are dependent upon the construction and the operating conditions of the engine. In a twin flow bypass engine, the vibrations due to afterburn depend on the primary richness of the fuel in the primary flow I as illustrated in FIG. 3, on the secondary richness of the fuel in the secondary flow, II and of the pressure of the gases in the afterburner duct. In particular, the vibration zones are greater when the pressures in the engine and in the afterburner duct are high.

These vibration zones may appear within an afterburn operating region situated between the idling level and the full throttle level and/or within an afterburn operating region situated at full throttle.

The invention involves therefore an engine tuning phase in which the zones in which vibration frequencies appear are determined experimentally by varying the richness of the fuel in the primary and secondary flows, and also the pressure of the gases in the afterburner duct, for different operating conditions of the engine, and for different afterburn operating regions.

Figure 1:
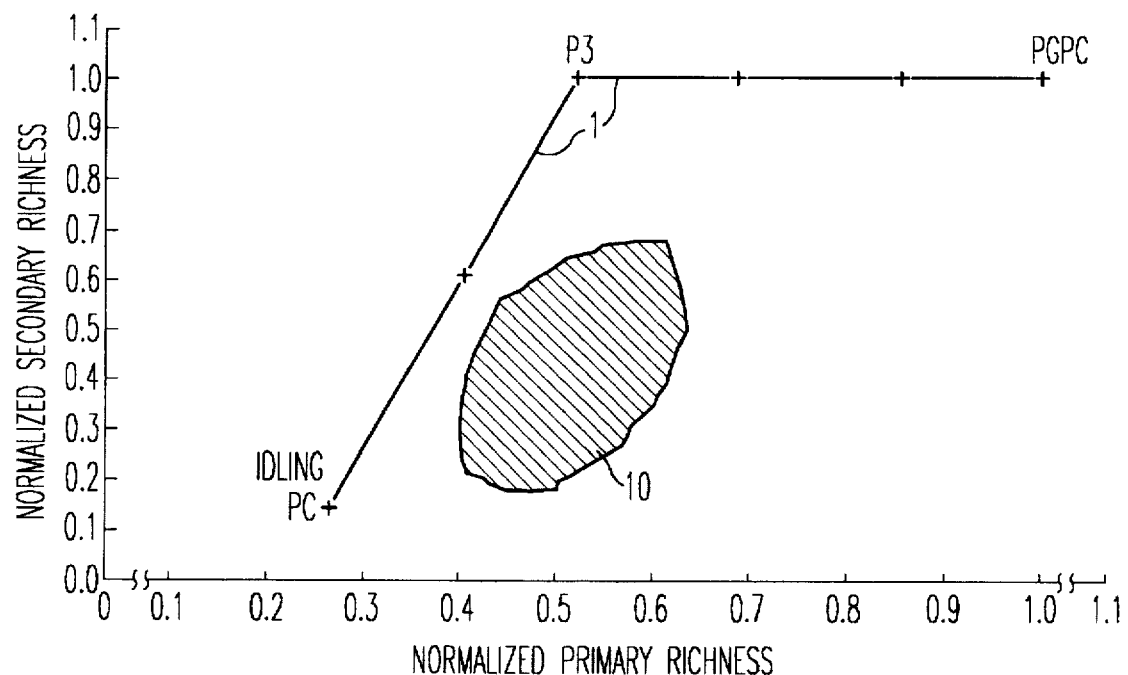
FIG. 1 illustrates an example of the detection of a vibration zone as a function of the values of the primary and secondary richnesses, and an example of a law for apportioning the primary and secondary richnesses which enables this vibration zone to be avoided when the afterburn operation is between idling and full throttle.

FIG. 1 shows, in a two-dimensional diagram corresponding to the secondary richness as a function of the primary richness, a vibration zone and one example of a law for apportioning the richness so as to avoid this vibration zone. The vibration zone 10 shown in this figure corresponds to an afterburn operation situated between idling and full throttle, and is plotted at constant pressure by varying the primary and secondary richness values. Because the dimensions of this zone increase as the pressure of the gases in the afterburner duct increases, it is preferable to seek this vibration zone by running the engine under the most disadvantageous operating conditions for which the value of the pressure in the afterburner duct, and the dimensions of the vibration zone, are at their greatest. For example, the pressure at the engine intake, termed catch pressure, will be set at a value in excess of, or equal to, 2 bar. These working conditions of the engine correspond, in aircraft terms, to flight conditions at high speed and low altitude (close to the ground). With such a procedure, any regulating law defined for a maximum pressure value and enabling avoidance of the vibration zones situated between the afterburn operating points at idling and full throttle may be used for all operating conditions of the engine.

The idling and full throttle level of afterburn, respectively termed idling PC and PGPC, correspond to required set values of primary and secondary richness. The idling PC set value corresponds to minimum values of primary and secondary richness, and is specified particularly by stability and carbonization conditions; the PGPC set value corresponds to maximum values of primary and seconary richness, and is specified by thrust and performance conditions of the engine.

The operating points for changing the primary and secondary richness between these two set values increase and are generally determined as a function of the position of the aircraft pilot's throttle control lever. The invention involves selecting these operating points having regard to the position of the vibration zone, so as to avoid this vibration zone. To this end, for example, the change in the value of the primary and secondary richness may be determined by a point-by-point selection between the idling PC and PGPC points, all points being selected outside the vibration zone. In particular, this may be defined by selecting, with reference of the two-dimensional diagram corresponding to the secondary richness as a function of the primary richness, an intermediate point P3 situated outside the vibration zone, and then obtaining the other points by linear interpolation between the idling PC and P3 points, and between the P3 and PGPC points. Point P3 is selected in such a way that all the points obtained by linear interpolation are situated outside the vibration zone. In FIG. 1, the parts along line 1 showing the relationship between normalized primary richness and normalized secondary richness pass through an intermediate point P3 situated between the idling PC and PGPC points which has the same secondary richness value as point PGPC. The secondary richness thus changes initially as a function of primary richness, following an increasing linear law between the idling PC and P3 points, and then remains constant between points P3 and PGPC.

The points illustrated in FIG. 1 may be obtained by combining selection of points for varying the primary and secondary richness as a function of the position of the pilot's throttle control lever. These selection may be, for the primary richness, a linear selection increasing between the idling PC and PGPC points, and for the secondary richness, a linear selection between the idling PC and P3 points followed by a constant value between the P3 and PGPC points.

The point values represented in FIG. 1 is only one particular example; it being possible to choose point P3 differently, to choose several intermediate points, or to choose a different law between the idling PC and PGPC points.

Furthermore, it is also possible to take into account an additional parameter which varies within the flight range of the aircraft.

This parameter is the gas pressure in the afterburner duct. In this case, taking into account the influence of this additional parameter on the development of the vibration frequencies makes it possible to establish a group of selections of points for regulating the primary and secondary richness between the idling PC and PGPC points, each selection of points corresponding to a given pressure and to a given flight condition, and thus to obtain a selection for varying the fuel as a function of the pilot's throttle control lever which is variable within the flight range of the aircraft.

Figure 2:
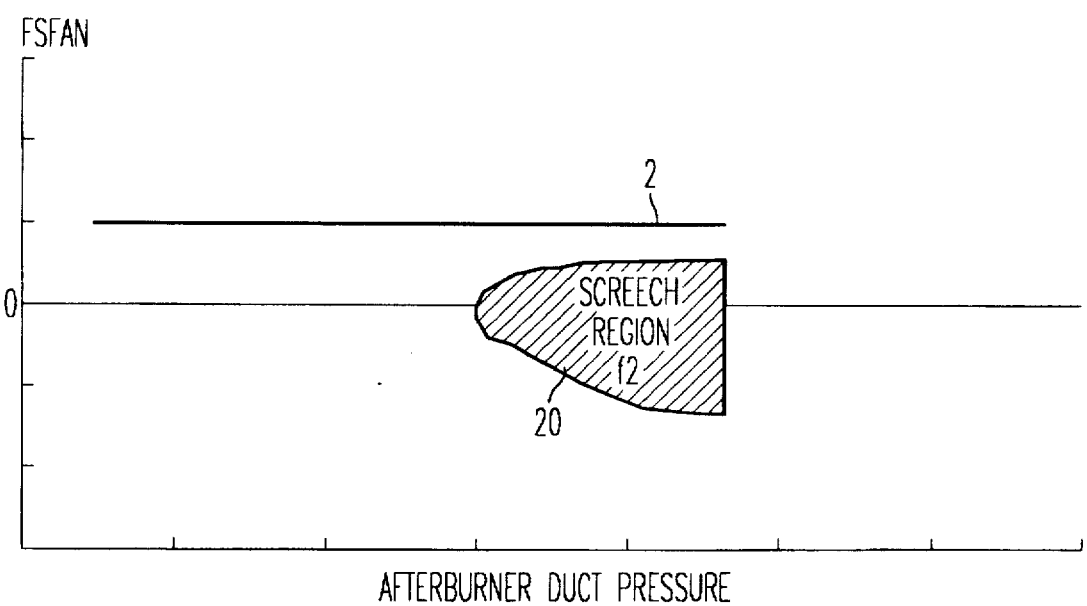
FIG. 2 illustrates an example of the detection of a vibration zone as a function of pressure and as a function of a parameter, termed FSFAN, characteristic of the enrichment or the depletion of the secondary flow relative to a given value of overall afterburn richness, and an example of selecting operating points for changing the FSFAN parameter which enables this vibration zone to be avoided when the afterburn operation is at full throttle.

FIG. 2 shows a vibration zone and an example of a selection of points for apportioning the fuel in the secondary flow within a range of afterburn operation situated at full throttle.

The set value PGPC, specified by conditions of thrust and performance of the engine, is fixed for a given flight condition (a flight condition is characterized in particular by the altitude and the speed of the aircraft) but changes within the flight range of the aircraft. For a given thrust condition there is a set value of the overall fuel richness. The apportionment of the fuel between the primary and secondary flows is subsequently specified by the operating conditions of the engine and so as to prevent the development of vibration frequencies at full throttle.

To establish the zones in which vibration frequencies develop at full throttle afterburn, the invention proposes that consideration be given to a parameter, denoted by FSFAN, giving an indication of the enrichment or depletion of the secondary flow relative to the overall afterburn richness, and that this parameter is varied as a function of pressure in the afterburner duct, this pressure being correlated to the flight of the aircraft. The FSFAN parameter is defined in the following manner:

$$FSFAN = \frac{\text{Secondary richness}}{\text{overall richness}} - 1;$$

In FIG. 2, one example of a zone 20 in which vibrations develop is shown in a FSFAN diagram as a function of pressure in the afterburner duct. This vibration zone is plotted for a given overall richness value. The vibration zone is a so-called screech zone and its frequency is f2.

The selection of operating points 2 for changing the primary and secondary richness at full throttle afterburn is then determined so as to avoid the vibration zone by programming the change in the FSFAN parameter as a function of the pressure in the afterburner duct by a point-by-point law 2, one example of which is shown in FIG. 2.

The values of primary and secondary richness are deduced from the FSFAN law using the following formulae:

secondary richness = $(1 + FSFAN) \cdot$ (overall PC richness)

primary richness =

$$\left( 1 - \frac{\text{(secondary air flow)}}{\text{primary air flow}} \cdot FSFAN \right) \cdot \text{(overall } PC \text{ richness)}$$

wherein the term PC denotes afterburn.

The example shown in FIG. 2 relates to the case where the set value of the overall richness is fixed.

As the overall richness value may vary within the flight range of the aircraft, it is possible to take this second parameter into account and to establish the zones in which vibrations develop as a function of the pressure in the afterburner duct and for different values of overall richness.

In particular, increasing values of the overall richness bring about an increase in the size of the vibration zone when the diagram representing FSFAN is considered as a function of the pressure in the afterburner duct.

In this case, a consideration of the influence of this second parameter on the vibration zones enables a group of laws to be established for apportioning the richness in an afterburn operating range situated at full throttle, each law corresponding to a particular value of the overall richness.

The invention is not limited to the examples described. In particular, it may be applied to multiflow turbojet engines having two or more flows, by regulating the fuel richness values in the various flows. It may also be applied to multihead combustion chambers having several fuel circuits, by regulating the fuel richness values in the different circuits to avoid vibration zones.

We claim:

1. A method of preventing instabilities due to combustion in a turbojet engine having a primary flow and secondary flow, and an afterburner into which an air-fuel mixture is injected in proportions measured in terms of primary richness and secondary richness from each of said flows and of overall richness, said method comprising the steps of:

- detecting experimentally vibration zones created during afterburn as a function of the operating conditions of said engine and as a function of an afterburn operating region, said vibration zones comprising a first zone of operation located between a minimum recorded value of idling of post-combustion and a maximum recorded value of post-combustion at full throttle and a second zone of operation located at full throttle post-combustion; and

- selecting operating points of post combustion for regulating the fuel richness from each of said primary and secondary flows to enable the detected vibration zones to be avoided wherein first and second groups of operating points for regulation of fuel richness mixtures for each flow are selected, said first group of operating points being an operating area of post-combustion located between idling and full throttle, and said second group of operating points being a functioning area of post-combustion located at full throttle.

2. A method according to claim 1 which comprises detecting, for an afterburn operating region situated between idling and full throttle, said vibration zones as a function of said primary and secondary fuel richness values and for at least one operating condition of said engine corresponding to a maximum pressure value in the afterburner duct, and wherein at least one of said first group of operating points for regulating said secondary richness as a function of said primary richness is selected so as to avoid the vibration zones detected in the operating condition of said engine corresponding to said maximum pressure value in said afterburner duct.

3. A method according to claim 2, wherein said first group of operating points selected for regulating the fuel richness of said primary and secondary flows for said maximum pressure value in said afterburner duct are used for all operating conditions of said engine.

4. A method according to claim 2, wherein said vibration zones are detected as a function of said primary and secondary fuel richness values and as a function of the pressure in said afterburner duct, and wherein several groups of operating points are selected for regulating said secondary richness as a function of said primary richness, each group of operating points corresponding to a particular pressure value in said afterburner duct.

5. A method according to claim 2 wherein, for an afterburn operating region situated between idling and full throttle and for a fixed value of the pressure in the afterburner duct, said group of operating points selected for regulating said secondary richness as a function of the primary richness correspond to increasing primal and secondary richness values between the minimum recorded value of idling of post-combustion and the maximum recorded value of post-combustion at full throttle, all of said operating points being selected outside said vibration zones.

6. A method according to claim 1 wherein, for an afterburn operating region during full throttle operation, said vibration zones are detected as a function of the pressure in the afterburner duct and as a function of a parameter characteristic of the enrichment or of the depletion of said secondary flow relative to a predetermined value of the overall afterburn richness, and wherein at least one second group of operating points are selected for regulating said parameter as a function of said pressure in said afterburner duct so as to avoid the vibration zones detected for afterburn at said full throttle operation.

7. A method according to claim 6, which comprises detecting said vibration zones for different values of the overall afterburn richness, and several second groups wherein said second groups of operating points are selected for regulating said parameter, each of said operating points selected corresponding to a given value of overall afterburn richness.

* * * * *